United States Patent [19]

Morman

[11] Patent Number: 5,116,662
[45] Date of Patent: * May 26, 1992

[54] MULTI-DIRECTION STRETCH COMPOSITE ELASTIC MATERIAL

[75] Inventor: Michael T. Morman, Alpharetta, Ga.

[73] Assignee: Kimberly-Clark Corporation, Neenah, Wis.

[ * ] Notice: The portion of the term of this patent subsequent to Jan. 1, 2008 has been disclaimed.

[21] Appl. No.: 451,264

[22] Filed: Dec. 15, 1989

[51] Int. Cl.⁵ .................................................. B32B 27/14
[52] U.S. Cl. .................................. 428/198; 428/152; 428/245; 428/253; 428/284; 428/286; 428/287; 428/297; 428/298; 428/903; 428/913
[58] Field of Search ............... 428/152, 198, 245, 253, 428/284, 286, 287, 297, 298, 913, 903

[56] References Cited

U.S. PATENT DOCUMENTS

| | | |
|---|---|---|
| 1,741,530 | 12/1929 | Mayer . |
| 2,004,110 | 6/1935 | Head . |
| 2,574,200 | 11/1951 | Teague ................................. 23/74 |
| 3,047,444 | 7/1962 | Harwood ............................. 154/46 |
| 3,341,394 | 9/1967 | Kinney ................................ 161/72 |
| 3,410,748 | 11/1968 | Blue .................................... 161/76 |
| 3,485,695 | 12/1969 | Ness ................................... 156/229 |
| 3,932,682 | 1/1976 | Loft et al. ........................... 428/296 |
| 4,013,816 | 3/1977 | Sabee et al. ........................ 428/288 |
| 4,209,563 | 6/1980 | Sisson ................................. 428/288 |
| 4,342,812 | 8/1982 | Selwood ............................. 428/286 |
| 4,443,513 | 4/1984 | Meitner et al. .................... 422/195 |
| 4,486,485 | 12/1984 | Sookne ............................... 428/198 |
| 4,489,543 | 12/1984 | Bromley et al. .................... 57/208 |
| 4,515,854 | 5/1985 | Kogame et al. .................... 428/288 |
| 4,551,378 | 11/1985 | Carey, Jr. ............................ 428/198 |
| 4,554,121 | 11/1985 | Kramers ............................. 264/103 |
| 4,606,964 | 8/1986 | Wideman ........................... 428/152 |
| 4,652,487 | 3/1987 | Morman .............................. 428/138 |
| 4,657,802 | 4/1987 | Morman .............................. 428/152 |
| 4,668,566 | 5/1987 | Braun ................................. 428/286 |
| 4,677,695 | 7/1987 | Van Gompel et al. ................. 2/79 |
| 4,692,368 | 9/1987 | Taylor et al. ....................... 428/137 |
| 4,720,415 | 1/1988 | Wielen et al. ...................... 428/152 |
| 4,789,699 | 12/1988 | Kieffer et al. ...................... 524/271 |
| 4,981,747 | 1/1991 | Morman .............................. 428/283 |

FOREIGN PATENT DOCUMENTS

| | | |
|---|---|---|
| 30418 | 6/1981 | European Pat. Off. . |
| 127483 | 12/1984 | European Pat. Off. . |
| 0212284 | 3/1987 | European Pat. Off. . |
| 0217032 | 4/1987 | European Pat. Off. . |
| 237642 | 9/1987 | European Pat. Off. . |
| 0239080 | 9/1987 | European Pat. Off. . |
| 2632875 | 1/1982 | Fed. Rep. of Germany . |
| 3734963 | 10/1987 | Fed. Rep. of Germany . |
| 648644 | 1/1951 | United Kingdom . |
| 1576436 | 10/1980 | United Kingdom . |
| WO90/03464 | 4/1990 | World Int. Prop. O. . |

*Primary Examiner*—James J. Bell
*Attorney, Agent, or Firm*—Karl V. Sidor

[57] ABSTRACT

The present invention provides a composite elastic material capable of stretching in at least two directions. The material is disclosed as having at least one elastic sheet and at least one necked material joined to the elastic sheet at least at three locations arranged in a nonlinear configuration, so that the necked web is gathered between at least two of those locations. Also disclosed is a method of producing a composite elastic material capable of stretching in at least two directions.

26 Claims, 3 Drawing Sheets

A > B

MULTI-DIRECTION STRETCH COMPOSITE ELASTIC MATERIAL

FIELD OF THE INVENTION

The present invention relates to elasticized materials and a method of making the same. Generally speaking, the present invention relates to a composite elastic material including at least one elastic sheet.

BACKGROUND OF THE INVENTION

Plastic nonwoven webs formed by nonwoven extrusion processes such as, for example, meltblowing processes and spunbonding processes may be manufactured into products and components of products so inexpensively that the products could be viewed as disposable after only one or a few uses. Representatives of such products include diapers, tissues, wipes, garments, mattress pads and feminine care products.

Some of the problems in this area are the provision of an elastic material which is resilient and flexible while still having a pleasing feel. One problem is the provision of an elastic material which does not feel plastic or rubbery. The properties of the elastic materials can be improved by forming a laminate of an elastic material with one or more nonelastic materials on the outer surface which provide better tactile properties.

Nonwoven webs formed from nonelastic polymers such as, for example, polypropylene are generally considered nonelastic. The lack of elasticity usually restricts these nonwoven web materials to applications where elasticity is not required.

Composites of elastic and nonelastic materials have been made by bonding nonelastic materials to elastic materials in a manner that allows the entire composite material to stretch or elongate, typically in one direction, so they can be used in garment materials, pads, diapers and personal care products where elasticity may be desired.

In one such composite material, a nonelastic material is joined to an elastic sheet while the elastic sheet is in a stretched condition so that when the elastic sheet is relaxed, the nonelastic material gathers between the locations where it is bonded to the elastic sheet. The resulting composite elastic material is stretchable to the extent that the nonelastic material gathered between the bond locations allows the elastic sheet to elongate. An example of this type of composite material is disclosed, for example, by U.S. Pat. No. 4,720,415 to Vander Wielen et al., issued Jan. 19, 1988.

Another elastic sheet could be used in place of the nonelastic gatherable material in the composite of Vander Wielen et al. so that the resulting composite material may be capable of stretching in more than one direction. However, a composite formed solely from elastic sheets would have the undesirable plastic or rubbery feel which was intended to be eliminated by producing composites of elastic and nonelastic materials.

DEFINITIONS

The term "elastic" is used herein to mean any material which, upon application of a biasing force, is stretchable, that is, elongatable, at least about 60 percent (i.e., to a stretched, biased length which is at least about 160 percent of its relaxed unbiased length), and which, will recover at least 55 percent of its elongation upon release of the stretching, elongating force. A hypothetical example would be a one (1) inch sample of a material which is elongatable to at least 1.60 inches and which, upon being elongated to 1.60 inches and released, will recover to a length of not more than 1.27 inches. Many elastic materials may be elongated by much more than 60 percent (i.e., much more than 160 percent of their relaxed length), for example, elongated 100 percent or more, and many of these will recover to substantially their initial relaxed length, for example, to within 105 percent of their initial relaxed length, upon release of the stretching force.

As used herein, the term "nonelastic" refers to any material which does not fall within the definition of "elastic," above.

As used herein, the terms "recover" and "recovery" refer to a contraction of a stretched material upon termination of a biasing force following stretching of the material by application of the biasing force. For example, if a material having a relaxed, unbiased length of one (1) inch is elongated 50 percent by stretching to a length of one and one half (1.5) inches the material would be elongated 50 percent (0.5 inch) and would have a stretched length that is 150 percent of its relaxed length. If this exemplary stretched material contracted, that is recovered to a length of one and one tenth (1.1) inches after release of the biasing and stretching force, the material would have recovered 80 percent (0.4 inch) of its one-half (0.5) inch elongation. Recovery may be expressed as [(maximum stretch length−final sample length)/(maximum stretch length−initial sample length)]×100.

As used herein, the term "nonwoven web" means a web that has a structure of individual fibers or threads which are interlaid, but not in an identifiable, repeating manner. Nonwoven webs have been, in the past, formed by a variety of processes such as, for example, meltblowing processes, spunbonding processes and bonded carded web processes.

As used herein, the term "microfibers" means small diameter fibers having an average diameter not greater than about 100 microns, for example, having an average diameter of from about 0.5 microns to about 50 microns, more particularly, microfibers may have an average diameter of from about 4 microns to about 40 microns.

As used herein, the term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin, the disclosure of which is hereby incorporated by reference.

As used herein, the term "spunbonded fibers" refers to small diameter fibers which are formed by extruding a molten thermoplastic material as filaments from a plurality of fine, usually circular, capillaries of a spinnerette with the diameter of the extruded filaments then being rapidly reduced as by, for example, eductive drawing or other well-known spunbonding mechanisms. The production of spunbonded nonwoven webs is illustrated in patents such as, for example, in U.S. Pat. No. 4,340,563 to Appel et al., and U.S. Pat. No.

3,692,618 to Dorschner et al. The disclosures of both these patents are hereby incorporated by reference.

As used herein, the term "interfiber bonding" means bonding produced by entanglement between individual fibers to form a coherent web structure without the use of thermal bonding. This fiber entangling is inherent in the meltblown processes but may be generated or increased by processes such as, for example, hydraulic entangling or needlepunching. Alternatively and/or additionally, a bonding agent can be utilized to increase the desired bonding and to maintain structural coherency of a fibrous web. For example, powdered bonding agents and chemical solvent bonding may be used.

As used herein, the term "sheet" means a layer which may either be a film or a nonwoven web.

As used herein, the term "necked material" refers to any material which has been constricted in at least one dimension by applying a tensioning force in a direction that is perpendicular to the desired direction of neckdown. Processes that may be used to constrict a material in such a manner include, for example, drawing processes.

As used herein, the term "neckable material" means any material which can be necked.

As used herein, the term "percent neckdown" refers to the ratio determined by measuring the difference between the un-necked dimension and the necked dimension of the neckable material and then dividing that difference by the un-necked dimension of the neckable material.

As used herein, the term "composite elastic material" refers to a multilayer material adapted to stretch and recover in at least two directions and which has at least one elastic layer joined to at least one necked material at least at three locations arranged in a nonlinear configuration wherein the necked material is gathered between at least two of the locations where it is joined to the elastic layer. The composite elastic material of the present invention has stretch and recovery in at least one direction, for example, the machine direction, to the extent that the gathers in the necked material allow the elastic material to elongate. The composite elastic material also has stretch and recovery in at least one other direction, for example, in a direction generally parallel to the neckdown of the necked material (e.g., typically in the cross-machine direction). The composite elastic material may be stretched in that direction to about the necked material's pre-necked width. The composite elastic material is adapted to recover to about its initial width (i.e., the necked material's necked width) because the recovery of the elastic sheet causes the attached necked material to recover to its necked width.

The terms "elongation" or "percent elongation" as used herein refers to a ratio determined by measuring the difference between an elastic material's extended and unextended length in a particular dimension and dividing that difference by the elastic material's unextended length in that same dimension.

As used herein, the term "superabsorbent" refers to absorbent materials capable of absorbing at least 5 grams of aqueous liquid per gram of absorbent material (e.g., greater than 20 grams of distilled water per gram of absorbent material) while immersed in the liquid for 4 hours and holding substantially all of the absorbed liquid while under a compression force of up to about 1.5 psi.

As used herein, the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic, syndiotactic and random symmetries.

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, solvents, particulates and materials added to enhance processability of the composition.

SUMMARY OF THE INVENTION

In accordance with the present invention there is provided a method of producing a composite elastic material adapted to stretch and recover in at least two directions, the method including the following steps:

applying a tensioning force to at least one neckable material to neck the material;

elongating an elastic sheet;

joining the tensioned, necked material to the elongated elastic sheet at least at three locations arranged in a nonlinear configuration; and relaxing the elongated elastic sheet so that the necked web is gathered between at least two of the locations.

The tensioned, necked material may be joined to the elongated elastic sheet by overlaying the materials and applying heat and/or pressure to the overlaid materials. Alternatively, the layers may by joined by using other bonding methods and materials such as, for example, adhesives, pressure sensitive adhesives, ultrasonic welding, high energy electron beams, and/or lasers.

The elastic sheet used as a component of the composite elastic material may be a pressure sensitive elastomer adhesive sheet. If the elastic sheet is a nonwoven web of elastic fibers or pressure sensitive elastomeric adhesive fibers, the fibers may be meltblown fibers. The meltblown fibers may include meltblown microfibers.

The necked material used as a component of the composite elastic material is formed from a neckable material. The neckable materials may be any material that can be necked, including knitted fabrics, loosely woven fabrics, and nonwoven webs. Neckable nonwoven webs include, for example, bonded carded webs, spunbonded webs, or webs of meltblown fibers. The meltblown fibers may include meltblown microfibers. The neckable material may also have multiple layers such as, for example, multiple spunbonded layers and/or multiple meltblown layers. The neckable material may be made of polymers such as, for example, polyolefins. Exemplary polyolefins include polypropylene, polyethylene, polybutylene, ethylene copolymers, propylene copolymers, and butylene copolymers.

The neckable material may be necked by applying a tensioning force in a direction perpendicular to the desired direction of neckdown. The necked material is joined to an elongated elastic sheet at least at three locations arranged in a nonlinear configuration so that when the elongated elastic sheet is relaxed, the necked material is gathered between at least two of those locations.

The resulting composite elastic material has stretch and recovery in at least one direction, for example, the machine direction, to the extent that the gathers in the necked material allow the elastic material to elongate. The composite elastic material also has stretch and recovery in at least one other direction, for example, in a direction generally parallel to the neckdown of the necked material. The neckdown of the necked material may be in the cross-machine direction and the composite elastic material may be stretched in that direction typically to about the necked material's initial width. The composite elastic material is adapted to recover to about its initial width (i.e., the necked material's necked width) because the recovery of the elastic sheet causes the attached necked material to recover to its necked width.

DETAILED DESCRIPTION OF THE INVENTION

Figure 1:
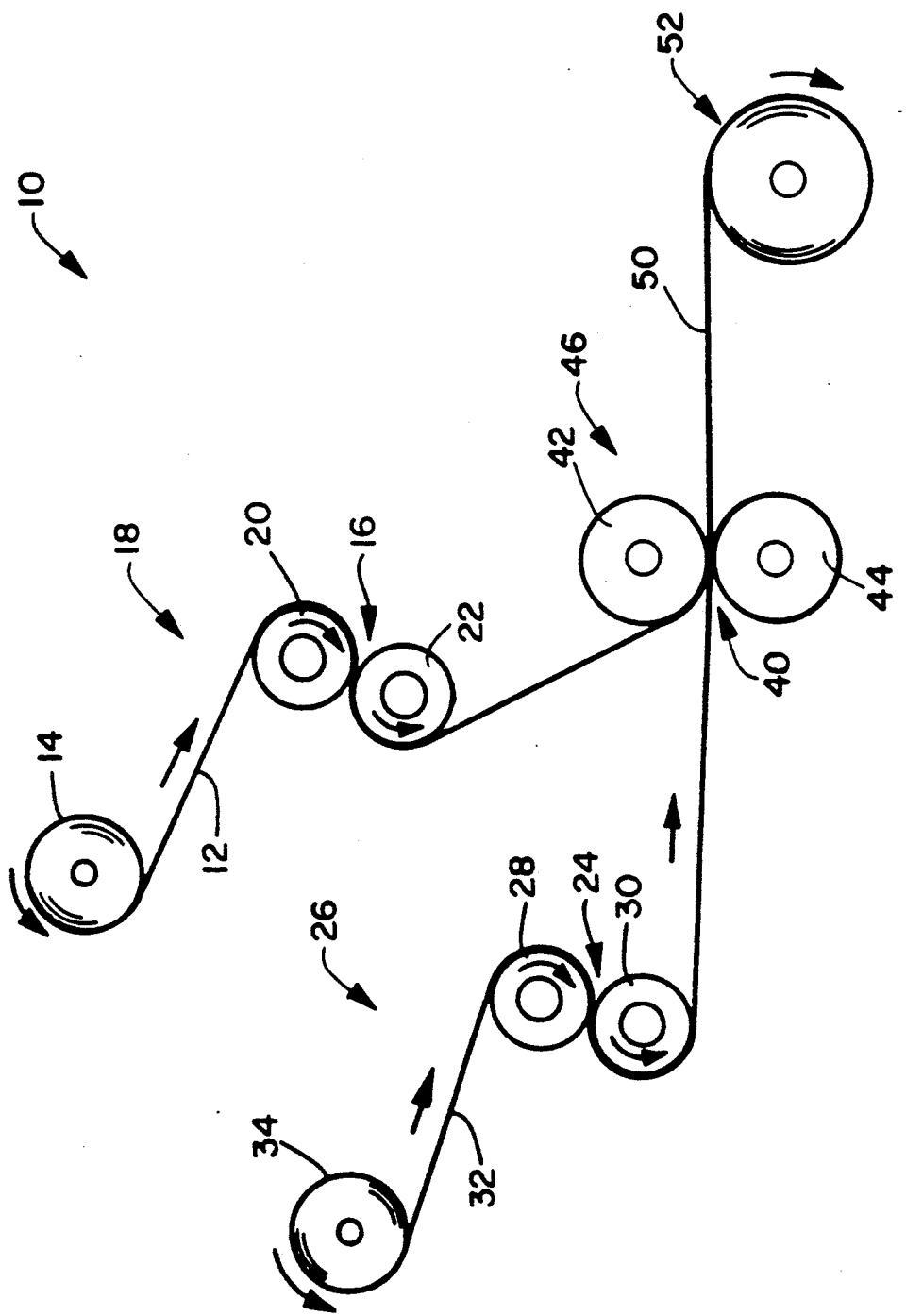
FIG. 1 is a schematic representation of an exemplary process for forming a composite elastic material.

Referring to FIG. 1 of the drawings there is schematically illustrated at 10 a process for forming a composite elastic material capable of stretching in at least two directions.

According to the present invention, a neckable material 12 is unwound from a supply roll 14 and travels in the direction indicated by the arrow associated therewith as the supply roll 14 rotates in the direction of the arrows associated therewith. The neckable material 12 passes through a nip 16 of a first S-roll arrangement 18 formed by the stack rollers 20 and 22.

The neckable material 12 may be formed by known nonwoven extrusion processes, such as, for example, known meltblowing processes or known spunbonding processes, and passed directly through the nip 16 without first being stored on a supply roll.

An elastic sheet 32 is unwound from a supply roll 34 and travels in the direction indicated by the arrow associated therewith as the supply roll 34 rotates in the direction of the arrows associated therewith. The elastic sheet passes through the nip 24 of a second S-roll arrangement 26 formed by the stack rollers 28 and 30. The elastic sheet 32 may be formed by extrusion processes such as, for example, meltblowing processes or film extrusion processes and passed directly through the nip 24 without first being stored on a supply roll.

The neckable material 12 passes through the nip 16 of the first S-roll arrangement 18 in a reverse-S path as indicated by the rotation direction arrows associated with the stack rollers 20 and 22. From the first S-roll arrangement 18, the neckable material 12 passes through the pressure nip 40 formed by the bonder rollers 42 and 44 of a bonder roller arrangement 46. At the same time, the elastic sheet 32 passes through the nip 24 of the second S-roll arrangement 26 in a reverse-S path as indicated by the rotation direction arrows associated with the stack rollers 28 and 30. From the second S-roll arrangement 26, the elastic sheet 32 passes through the pressure nip 40 formed by the bonder rollers 42 and 44 of a bonder roller arrangement 46.

Because the peripheral linear speed of the rollers of the first S-roll arrangement 18 is controlled to be less than the peripheral linear speed of the bonder rollers 42 and 44 of the bonder roller arrangement 46, the neckable material 12 is tensioned between the S-roll arrangement 18 and the pressure nip 40 of the bonder roll arrangement 46. In a similar manner, the peripheral linear speed of the rollers of the second S-roll arrangement 26 is controlled to be less than the peripheral linear speed of the bonder rollers of the bonder roller arrangement 46 so that the elastic sheet 32 is tensioned and elongated between the second S-roll arrangement 26 and the pressure nip 40 of the bonder roll arrangement 46.

By adjusting the difference in the speeds of the rollers, the neckable material 12 is tensioned so that it necks a desired amount and is maintained in such tensioned, necked condition while the elongated elastic sheet 32 is joined to the necked material 12 during their passage through the bonder roller arrangement 46 to form a composite elastic laminate 50 which passes to a wind-up roll 52 which is rotating at a peripheral liner speed that is about the same or less than the peripheral linear speed of bonder rollers 42 and 44. Alternatively, the composite elastic laminate 50 may pass to a holding box (not shown) to allow the elongated elastic sheet 32 to retract and gather the necked material 12.

Other methods of tensioning the neckable material 12 may be used such as, for example, tenter frames or other stretcher arrangements that expand the neckable material 12 in other directions such as, for example, the cross-machine direction and cause the neckable material 12 to neck in the perpendicular direction (e.g., the machine direction).

Conventional drive means and other conventional devices which may be utilized in conjunction with the apparatus of FIG. 1 are well known and, for purposes of clarity, have not been illustrated in the schematic view of FIG. 1.

If the bonder rollers 42 and 44 are heated bonded rollers which thermally bond the necked material 12 and the elongated elastic sheet 32, then upon emerging from the pressure nip 40 of the bonder roller arrangement 46, it may be desirable for the composite elastic material 50 to immediately pass to a holding box where the composite elastic material 50 is maintained in a relaxed unstretched condition long enough for the elastic sheet to cool sufficiently to avoid its cooling while it is in a stretched condition and thereby lose all or some of its ability to contract from the stretched dimensions which it had assumed during bonding. It has been found that elastic sheets, particularly low basis weight elastic sheets, may loose their ability to contract to or return to their original unstretched dimensions if they are maintained under tension at or above their softening temperature for any significant length of time. A brief recovery period in a relaxed, untensioned condition immediately after bonding has been found to be desirable to allow the low basis weight elastic sheet to contract and gather the necked material so the bonded web attains its elasticity in that direction to the extent that the necked material which is gathered between the bond locations allows the elastic sheet to elongate.

The neckable material 12 may be a nonwoven material such as, for example, spunbonded web, meltblown web or bonded carded web. If the neckable material is a web of meltblown fibers, it may include meltblown microfibers. The neckable material 12 may be made of fiber forming polymers such as, for example, polyolefins. Exemplary polyolefins include one or more of polyethylene, polypropylene, polybutylene, poly(methyl pentene), ethylene copolymers, propylene copolymers, and butylene copolymers. Useful polypropylenes include, for example, polypropylene available from the Himont Corporation under the trade designation PC-973, polypropylene available from the Exxon Chemical Company under the trade designation Exxon 3445, and polypropylene available from the Shell Chemical Company under the trade designation DX 5A09.

In one embodiment of the present invention, the nonelastic neckable material 12 is a multilayer material having, for example, at least one layer of spunbonded web joined to at least one layer of meltblown web, bonded carded web or other suitable material. For example, neckable material 12 may be a multilayer material having a first layer of spunbonded polypropylene having a basis weight from about 0.2 to about 8 ounces per square yard (osy), a layer of meltblown polypropylene having a basis weight from about 0.2 to about 4 osy, and a second layer of spunbonded polypropylene having a basis weight of about 0.2 to about 8 osy. Alternatively, the neckable material 12 may be single layer of material such as, for example, a spunbonded web having a basis weight of from about 0.2 to about 10 osy or a meltblown web having a basis weight of from about 0.2 to about 8 osy.

The neckable material 12 may also be a composite material made of a mixture of two or more different fibers or a mixture of fibers and particulates. Such mixtures may be formed by adding fibers and/or particulates to the gas stream in which meltblown fibers are carried so that an intimate entangled commingling of meltblown fibers and other materials, e.g., wood pulp, staple fibers and particulates such as, for example, hydrocolloid (hydrogel) particulates commonly referred to as super-absorbent materials, occurs prior to collection of the meltblown fibers upon a collecting device to form a coherent web of randomly dispersed meltblown fibers and other materials such as disclosed in U.S. Pat. No. 4,100,324, the disclosure of which is hereby incorporated by reference.

If the neckable material 12 is a nonwoven web of fibers, the fibers should be joined by interfiber bonding to form a coherent web structure which is able to withstand necking. Interfiber bonding may be produced by entanglement between individual meltblown fibers. The fiber entangling is inherent in the meltblown process but may be generated or increased by processes such as, for example, hydraulic entangling or needlepunching. Alternatively and/or additionally thermal bonding or a bonding agent may be used to increase the desired coherence of the web structure.

The elastic sheet 32 may be made from any material which may be manufactured in sheet form. Generally, any suitable elastomeric fiber forming resins or blends containing the same may be utilized for the elastomeric fibers, threads, filaments, and/or strands or the nonwoven webs of elastomeric fibers, threads, filaments, and/or strands of the invention and any suitable elastomeric film forming resins or blends containing the same may be utilized for the elastomeric films of the invention. Useful elastic sheets may have basis weights ranging from about 5 gsm (grams per square meter) to about 300 gsm, for example, from about 5 gsm to about 150 gsm.

For example, the elastic sheet 32 may be made from block copolymers having the general formula A-B-A' where A and A' are each a thermoplastic polymer endblock which contains a styrenic moiety such as a poly (vinyl arene) and where B is an elastomeric polymer midblock such as a conjugated diene or a lower alkene polymer. The elastic sheet 32 may be formed from, for example, (polystyrene/poly(ethylene-butylene)/polystyrene) block copolymers available from the Shell Chemical Company under the trademark KRATON G. One such block copolymer may be, for example, KRATON™ G-1657.

Other exemplary elastomeric materials which may be used to form elastic sheet 32 include polyurethane elastomeric materials such as, for example, those available under the trademark ESTANE from B. F. Goodrich & Co., polyamide elastomeric materials such as, for example, those available under the trademark PEBAX from the Rilsan Company, and polyester elastomeric materials such as, for example, those available under the trade designation Hytrel from E. I. DuPont De Nemours & Company. Formation of elastic sheets from polyester elastic materials is disclosed in, for example, U.S. Pat. No. 4,741,949 to Morman et al., hereby incorporated by reference. Elastic sheet 32 may also be formed from elastic copolymers of ethylene and at least one vinyl monomer such as, for example, vinyl acetates, unsaturated aliphatic monocarboxylic acids, and esters of such monocarboxylic acids. The elastic copolymers and formation of elastic sheets from those elastic copolymers are disclosed in, for example, U.S. Pat. No. 4,803,117.

Processing aids may be added to the elastomeric polymer. For example, a polyolefin may be blended with the elastomeric polymer (e.g., the A-B-A elastomeric block copolymer) to improve the processability of the composition. The polyolefin must be one which, when so blended and subjected to an appropriate combination of elevated pressure and elevated temperature conditions, is extrudable, in blended form, with the elastomeric polymer. Useful blending polyolefin materials include, for example, polyethylene, polypropylene and polybutene, including ethylene copolymers, propylene copolymers and butene copolymers. A particularly useful polyethylene may be obtained from the U.S.I. Chemical Company under the trade designation Petrothene NA 601 (also referred to herein as PE NA 601 or polyethylene NA 601). Two or more of the polyolefins may be utilized. Extrudable blends of elastomeric polymers and polyolefins are disclosed in, for example, U.S. Pat. No. 4,663,220 to Wisneski et al., hereby incorporated by reference.

The elastic sheet 32 may also be a pressure sensitive elastomer adhesive sheet. For example, the elastic material itself may be tacky or, alternatively, a compatible tackifying resin may be added to the extrudable elastomeric compositions described above to provide an elastomeric sheet that can act as a pressure sensitive adhesive, e.g., to bond the elastomeric sheet to a tensioned, reversibly necked nonelastic web. In regard to the tackifying resins and tackified extrudable elastomeric compositions, note the resins and compositions as disclosed in U.S. Pat. No. 4,787,699, hereby incorporated by reference.

Any tackifier resin can be used which is compatible with the elastomeric polymer and can withstand the high processing (e.g., extrusion) temperatures. If the elastomeric polymer (e.g., A-B-A elastomeric block copolymer) is blended with processing aids such as, for example, polyolefins or extending oils, the tackifier resin should also be compatible with those processing aids. Generally, hydrogenated hydrocarbon resins are preferred tackifying resins, because of their better temperature stability. REGALREZ TM and ARKON TM P series tackifiers are examples of hydrogenated hydrocarbon resins. ZONATAK TM 501 lite is an example of a terpene hydrocarbon. REGALREZ TM hydrocarbon resins are available from Hercules Incorporated. ARKON TM P series resins are available from Arakawa Chemical (U.S.A.) Incorporated. Of course, the present invention is not limited to use of such three tackifying resins, and other tackifying resins which are compatible with the other components of the composition and can withstand the high processing temperatures, can also be used.

A pressure sensitive elastomer adhesive may include, for example, from about 40 to about 80 percent by weight elastomeric polymer, from about 5 to about 40 percent polyolefin and from about 5 to about 40 percent resin tackifier. For example, a particularly useful composition included, by weight, about 61 to about 65 percent KRATON TM G-1657, about 17 to about 23 percent polyethylene NA 601, and about 15 to about 20 percent REGALREZ TM 1126.

The elastic sheet 32 may also be a multilayer material in that it may include two or more individual coherent webs and/or films. Additionally, the elastic sheet 32 may be a multilayer material in which one or more of the layers contain a mixture of elastic and nonelastic fibers or particulates. An example of the latter type of elastic web, reference is made to U.S. Pat. No. 4,209,563, incorporated herein by reference, in which elastomeric and non-elastomeric fibers are commingled to form a single coherent web of randomly dispersed fibers. Another example of such an elastic composite web would be one made by a technique such as disclosed in previously referenced U.S. Pat. No. 4,741,949. That patent discloses an elastic nonwoven material which includes a mixture of meltblown thermoplastic fibers and other materials. The fibers and other materials are combined in the gas stream in which the meltblown fibers are borne so that an intimate entangled commingling of meltblown fibers and other materials, e.g., wood pulp, staple fibers or particulates such as, for example, hydrocolloid (hydrogel) particulates commonly referred to as super-absorbents occurs prior to collection of the fibers upon a collecting device to form a coherent web of randomly dispersed fibers.

The bonder roller arrangement 46 may be a patterned calendar roller such as, for example, a pin embossing roller arranged with a smooth anvil roller. One or both of the calendar roller and the smooth anvil roller may be heated and the pressure between these two rollers may be adjusted by well-known means to provide the desired temperature, if any, and bonding pressure to join the tensioned, necked material 12 to the elastic sheet 32 forming a composite elastic material 50.

Tensioned, necked materials may be joined to the tensioned elastic sheet 32 at least at three places by any suitable means such as, for example, thermal bonding or ultrasonic welding. Thermal and/or ultrasonic joining techniques are believed to soften at least portions of at least one of the materials, usually the elastic sheet because the elastomeric materials used for forming the elastic sheet 32 have a lower softening point than the components of the necked material 12. Joining may be produced by applying heat and/or pressure to the overlaid tensioned elastic sheet 32 and the tensioned, necked material 12 by heating these portions (or the overlaid layer) to at least the softening temperature of the material with the lowest softening temperature to form a reasonably strong and permanent bond between the re-solidified softened portions of the elastic sheet 32 and the necked material 12.

The tensioned, necked materials should be joined to the tensioned elastic sheet at least at three locations which are arranged so that upon release of the tensioning force on the elastic sheet, puckers or gathers form in the necked material between at least two of the locations. Additionally, the three locations should be arranged so that when composite elastic material is stretched in a direction substantially parallel to the direction of neckdown (i.e., in a direction substantially perpendicular to the tensioning force applied to the neckable material during the necking process), the recovery of the elastic sheet results in the recovery of the necked material to substantially its necked dimensions. The three or more locations should be arranged in a nonlinear configuration to form for example, a triangular or polygonal pattern of locations where the necked material is joined to the elastic sheet.

With regard to thermal bonding, one skilled in the art will appreciate that the temperature to which the materials, or at least the bond sites thereof, are heated for heat-bonding will depend not only on the temperature of the heated roll(s) or other heat sources but on the residence time of the materials on the heated surfaces, the basis weights of the materials and their specific heats and thermal conductivities. However, for a given combination of materials, and in view of the herein contained disclosure the processing conditions necessary to achieve satisfactory bonding can be readily determined.

Alternatively, the necked material 12 and the tensioned elastic sheet 32 may by joined by using other bonding methods and materials such as, for example, adhesives, pressure sensitive adhesives, solvent welding, hydraulic entangling, high energy electron beams, and/or lasers.

Because the tensioned elastic sheet 32 is joined to the necked material 12, and the necked material 12 is extensible in only one direction (e.g., the cross-machine direction or the direction parallel to the direction of neckdown), the necked material tends to have a limiting effect on the degree of stretch of the elastic composite material in the direction that the necked material cannot be extended (e.g., the machine direction). To the extent that the necked material exhibits some resistance to being gathered, the elastic sheet will be unable to fully recover to its unstretched dimension once it is joined to the necked material. This requires that the distance that the elastic sheet is capable of stretching when it is joined to the necked material be greater than the desired stretch of the elastic composite material in the direction that the necked material cannot be easily extended (e.g., the machine direction). For example, if it is desired to prepare an elastic composite material that can be elongated about 100 percent in the machine direction (i.e., stretched to a length that is about 200 percent of its initial relaxed length), a 100 cm length of elastic web may be stretched in the machine direction to a length of, for example, 220 cm (120 percent elongation) and bonded at least at three locations (arranged in spaced-apart non-linear configuration) to a 220 cm length of necked material. The bonded composite elastic material is then allowed to relax and even if the elastic sheet is capable of recovering to its original 100 cm length, the necked material bonded thereto will inhibit full recovery and the composite may relax to a length of say, 110 cm. Puckers or gathers will form in the necked material between at least two the bond points. The resulting 110 cm length of composite material is stretchable in the machine direction to its 220 cm length to provide a composite material that can be elongated about 100 percent in the machine direction (i.e., stretched to a length that is about 200 percent of its initial relaxed length). The initial length of the necked material limits, in this hypothetical example, the attainable machine direction elongation of the composite material because the necked material would act as a "stop" to prevent further or excessive stretching of the elastic sheet in the machine direction under the effect of stretching forces which are less than the failure strength of the necked, gathered material.

The relation between the original dimensions of the neckable material 12 to its dimensions after neckdown determines the approximate limits of stretch of the composite elastic material in the direction of neckdown, typically the cross-machine direction.

Figure 2:
FIG. 2 is a plan view of an exemplary neckable material before tensioning and necking.
Figure 2A:
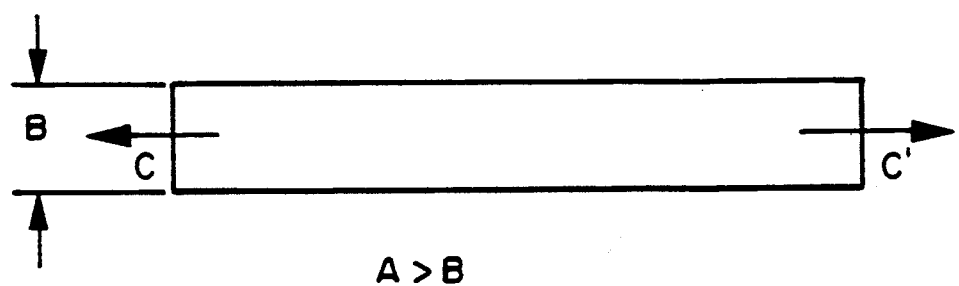
FIG. 2A is a plan view of an exemplary necked material.
Figure 2B:
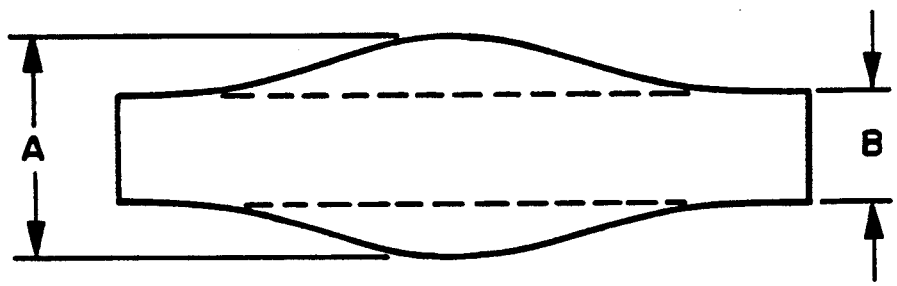
FIG. 2B is a plan view of an exemplary composite elastic material while partially stretched.

For example, with reference to FIGS. 2, 2A, and 2B, if it is desired to prepare a composite elastic material that can be elongated about 150 percent (i.e., stretched to a length that is about 250 percent of its initial relaxed length) in a direction generally parallel to the neckdown of the neckable material (e.g. cross-machine direction) and that can be elongated about 100 percent (i.e., stretched to a length that is about 200 percent of its initial relaxed length) in the perpendicular direction (e.g., machine direction), a width of neckable material shown schematically and not necessarily to scale in FIG. 2 having a width "A" such as, for example, 250 cm, is tensioned so that it necks down to a narrower width "B" of about 100 cm shown in FIG. 2A. The tensioning forces are shown as arrows C and C' in FIG. 2A.

The tensioned, necked material is joined to an elastic sheet which is about the same width "B" as the tensioned, necked material and which is stretchable in the cross-machine direction at least to about the same width "A" as the original pre-necked dimension of the necked material. For example, the elastic sheet may be approximately 100 cm and be stretchable to at least a width of 250 cm. The tensioned, necked material shown in FIG. 2A and the elastic sheet (not shown) are overlaid and joined at least at three spaced apart locations arranged in a nonlinear configuration while the elastic sheet is maintained at a machine-direction elongation of about 120 percent (i.e., stretched about 220 percent of its initial relaxed machine-direction dimension) because, as previously noted, the necked material tends to prevent the elastic sheet from retracting fully to its original length in the machine direction.

The joined layers are allowed to relax causing puckers or gathers to form in the necked material between at least two of the bond locations. The resulting composite elastic material shown schematically and not necessarily to scale in FIG. 2B has a width "B" of about 100 cm and is stretchable to at least the original 250 cm width "A" of the neckable material for an elongation of about 150 percent (i.e., stretchable to about 250 percent of its initial necked width "B"). The composite elastic material is adapted to recover to its initial width "B" of about 100 cm because recovery of the elastic sheet to its initial width "B" causes the attached necked material to recover to its necked width "B". Additionally, the composite elastic material is stretchable to about 100 percent in the machine direction which is the extent that the gathers or puckers in the necked material allow the elastic sheet to elongate in that direction. As can be seen from the example, the distance that the elastic sheet should be capable of stretching in the cross-machine direction before it is joined to the necked material needs only to be as great as the distance that the composite elastic material is desired to stretch in the cross-machine direction. However, as previously noted, the distance that the elastic sheet should be capable of stretching in the machine direction before it is joined to the necked material should be greater than the distance that the composite material is desired to stretch in the machine direction.

The gathers in the necked material may allow the composite elastic material to have stretch and recovery in a range of directions that are not substantially parallel to the machine direction, for example, in a direction that differs from the machine direction by about 45°. Similarly, the neckdown of the necked material may allow the composite elastic material to have stretch and recovery in a range of directions that are not substantially parallel to the direction of neckdown, for example, in a direction that differs from the direction of neckdown by about 45°. Because of the gathers in the necked material and the direction of neckdown may be aligned to allow stretch and recovery in generally perpendicular directions, and because the gathers and neckdown allow stretch and recovery in a range of directions, the composite elastic material may be adapted to have stretch and recovery in substantially all directions along the length and width of the material.

EXAMPLES 1-5

The composite elastic materials of examples 1-5 were made by joining an elastic sheet to at least one necked material. Tables 1, 4, 7, 10, 12 and 13 provide Grab Tensile Test data for control samples and composite elastic necked-bonded material samples. The Grab Tensile Tests were performed on a constant rate of extension tester, Instron Model 1122 Universal Testing Instrument, using 4 inch by 6 inch samples. The jaw faces of the tester were 1 inch by 1 inch and the crosshead speed was set at 12 inches per minute. The following mechanical properties were determined for each sample: Peak Load, Peak Total Energy Absorbed and Peak Elongation.

The samples were also cycled on the Instron Model 1122 with Microcon II—50 kg load cell and the results reported on Tables 1 to 13. The jaw faces of the tester were 3 inches wide by 1 inch high (i.e., in the direction to be tested) in this cycling test so the samples were cut to 3 inches by 7 inches (i.e., 7 inches in the direction to be tested) and weighed individually in grams. A 4 inch gauge length was used. Chart and crosshead speeds were set for 20 inches per minute and the unit was zeroed, balanced and calibrated according to the standard procedure. The maximum extension limit for the cycle length was set at a distance determined by calculating 56 percent of the "elongation to break" from the Grab Tensile Test. The samples were cycled to the specified cycle length four times and then were taken to break on the fifth cycle. The test equipment was set to measure Peak Load in pounds force, and Peak Energy Absorbed in inch pounds force per square inch for each cycle. On the fifth cycle (cycle to break), the Peak Elongation, Peak Load, and Peak Total Energy Absorbed were measured. The area used in the energy measurements (i.e., the surface area of material tested) is the gauge length (four inches) times the sample width (3 inches) which equals twelve square inches. The results of the Grab Tensile tests and cycle tests have been normalized for measured basis weight.

Peak Total Energy Absorbed (TEA) as used in the Examples and associated Tables is defined as the total energy under a stress versus strain (load versus elongation) curve up to the point of "peak" or maximum load. TEA is expressed in units of work/(length)$^2$ or (pounds force * inch)/(inches)$^2$. These values have been normalized by dividing by the basis weight of the sample in ounces per square yard (osy) which produces units of [(lbs$_f$* inch)/inch$^2$]/osy.

Peak Load as used in the Examples and associated Tables is defined as the maximum load or force encountered in elongating the sample to a specified elongation or to break. Peak Load is expressed in units of force (lbs$_f$) which have been normalized for the basis weight of the material resulting in a number expressed in units of lbs$_f$/(osy).

Elongation or Peak Elongation has the same general definition as previously set forth in the "Definition" section, and may be more specifically defined for the Examples and associated Tables as the relative increase in length of a specimen during the tensile test at Peak Load. Peak Elongation is expressed as a percentage, i.e., [(increase in length)/(original length)] × 100.

Permanent Set after a stretching cycle as used in the Examples and associated Tables is defined as a ratio of the increase in length of the sample after a cycle divided by the maximum stretch during cycling. Permanent Set is expressed as a percentage, i.e., [(final sample length − initial sample length)/(maximum stretch during cycling − initial sample length)] × 100. Permanent Set is related to recovery by the expression [permanent set = 100 − recovery] when recovery is expressed as a percentage.

In Tables 2, 3, 5, 6, 8, 9, and 11, (which provide the results of the cycle testing), the value reported for the Permanent Set in the "Perm Set" row and in the column titled "To Break" is the value for Peak Elongation (i.e., peak elongation to break) measured during the fifth (final) stretch cycle. In those same Tables, the cycle test results reported in the "To Break" column for the elastomeric sheet are the values read from the Instron test equipment when the elastomeric sheet was elongated to the Peak Elongation (i.e., elongation at peak load when the sample was tested to break) measured during the fifth (final) stretch cycle for the composite elastic material which incorporated that particular elastomeric sheet.

EXAMPLE 1

Neckable Spunbonded Material

A neckable web of conventionally produced spunbonded polypropylene having a basis weight of about 0.4 ounces per square yard (osy) was tested on an Instron Model 1122 Universal Testing Instrument. The tensile test results for the spunbonded web before necking are reported in Table 1 under the heading "Spunbond Control No. 1". The machine direction total energy absorbed is given in the column of Table 1 entitled "MD TEA". The machine direction peak load is given in the column entitled "MD Peak Load". The machine direction peak elongation is given in the column entitled "MD Peak Elong". The cross-machine direction total energy absorbed is given in the column entitled "CD TEA". The cross-machine direction peak load is given in the column entitled "CD Peak Load". The cross-machine direction peak elongation is given in the column entitled "CD Peak Elong".

Elastic Sheet

A blend of about 63% by weight KRATON G-1657, 20% polyethylene NA-601 and 17% REGALREZ 1126 having a melt flow of about 15 grams per ten minutes when measured at 190° C. and under a 2160 gram load; an elongation of about 750%; a modulus of elongation at 100% of about 175 psi; and a modulus of elongation at 300% of about 225 psi was formed into an elastic sheet of meltblown fibers utilizing conventional recessed die tip meltblowing process equipment. A four-bank meltblowing die arrangement was operated under the following conditions: die zone temperature from about 503° to about 548° F.; die polymer melt temperature from about 491° to about 532° F.; primary air temperature from about 544° to about 557° F.; pressure at die inlet/tip from about 85 to about 140 psig; forming wire vacuum about 2 inches of water; vertical forming distance about 11 inches, forming wire speed about 61 feet per minute and winder speed about 67 feet per minute. An elastic web of meltblown fibers was formed having a basis weight of about 70 grams per square meter (gsm). The sheet was tested on the Instron Model 1122 Universal Testing Instrument and the results are given in Table 1 under the heading "Elastomer Control No. 1" and in Table 2 under the heading "Elastomer Control No. 1."

Data reported in Table 2 for the last test cycle (i.e. "To Break") of "Elastic Control No. 1" was measured at the break elongation of the composite elastic material (i.e., "NSBL No. 1") which incorporates "Elastic Sheet Control No. 1". For instance, the break elongation for "NSBL No. 1" is reported in Table 2 at the "To Break" column and the "Perm Set" row as 78 percent elongation so that is the elongation where data for "Elastomer Control No. 1" was measured during the last test cycle and reported under the "To Laminate Break" column.

Composite Elastic Material

The neckable spunbond polypropylene material having a basis weight of 0.4 osy was unwound from a first supply roll at an unwind speed set at about 10 feet/minute. The supply roll unwind slipped so the unwind rate was measured at about 19 feet/minute (about 10% less than the bonder roll speed). The elastic sheet of meltblown fibers described above having a basis weight of about 70 grams per square meter, was unwound from a second supply roll at an unwind speed of about 10 feet/minute. The elastic sheet had a thin plastic film on one surface so it would stick to only one adjacent layer of material.

Both the neckable polypropylene material and the elastic meltblown sheet were fed to a bonder roller arrangement of one smooth anvil roll and one engraved calendar roll in which the surface of the bonder rollers travelled at a speed of about 21 feet/minute. The difference between the unwind speed of 10 feet/minute and the bonder roller speed of about 21 feet/minute tensioned both the neckable material and the elastic sheet resulting in an elongation of both materials.

Figure 3:
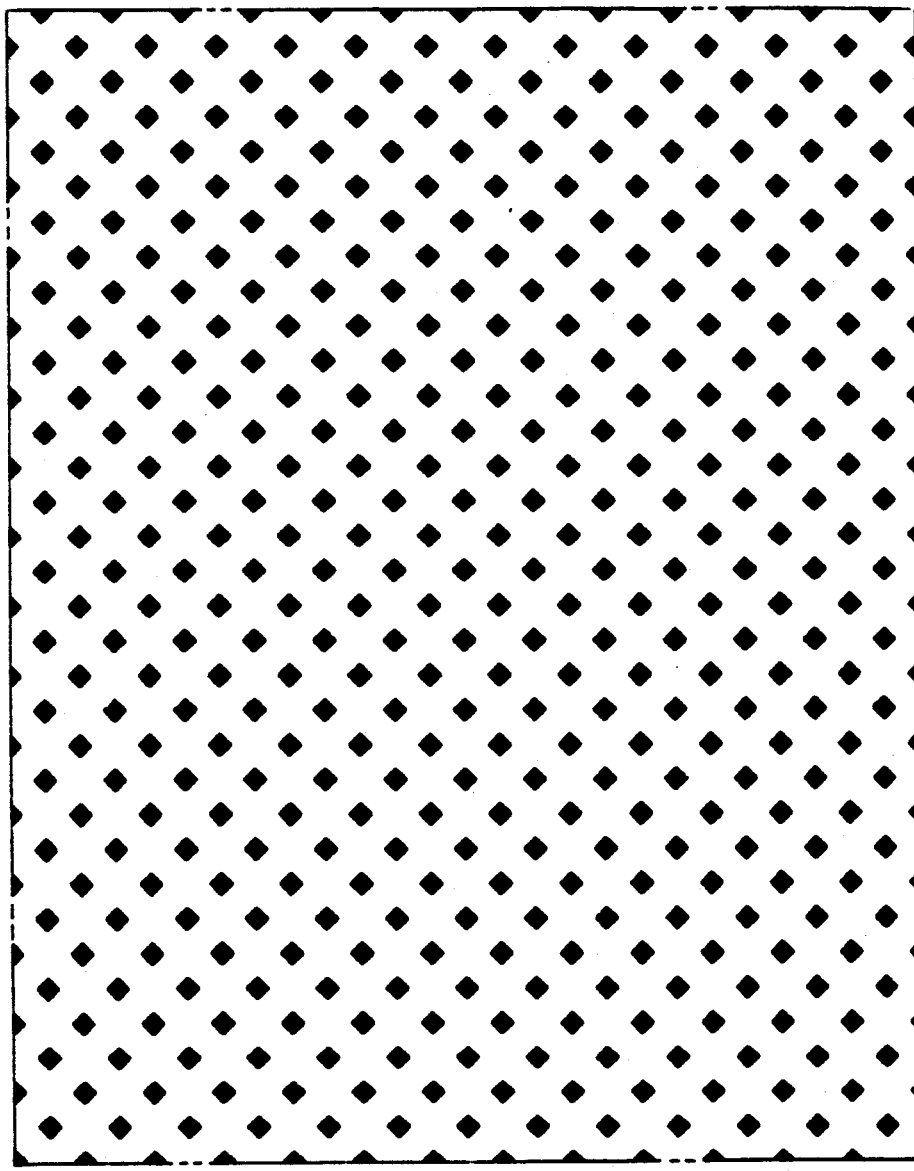
FIG. 3 is a representation of an exemplary bonding pattern used to join components of a composite elastic material.

FIG. 3 shows the pattern of the engraved calendar roller enlarged about 5 times. The bond pattern of the engraved roller had approximately 300 pins or bond points per square inch which produced a bond area of about 15 percent. The lines connecting the pins or bond points are drawing lines and are not present in the engraving pattern of the calender roller. The bond rollers were maintained at a temperature of about 127° F. and the pressure in the nip between the two bond rollers was approximately 355 pounds per linear inch (pli). The composite material was allowed to relax immediately after bonding.

The composite elastic material was tested on the Instron Model 1122 Universal Testing Instrument and the results are given in Tables 1, 2 and 3 under the heading "NSBL No. 1".

EXAMPLE 2

The neckable spunbonded polypropylene material and the elastic sheet of meltblown fibers of Example 1 were joined according to the procedure of Example 1 except that the elastic sheet was stretched a little less and the spunbonded material was stretched a little more. The bonder speed was set at 21 feet per minute, nip pressure was 355 pounds per linear inch, and the calendar roller and anvil roller temperatures were set at 127° F. The elastic sheet was unwound from a supply roll at a rate of 14 feet per minute. The neckable spunbonded polypropylene material was unwound from a supply roll. The unwind speed was set at a rate of about 14 feet per minute but slippage occurred so the unwind speed was measured at about 17 feet per minute or about 20 percent slower than the bonder. The difference in speed created a tension which caused the neckable material to neck and the elastic material to elongate before they were joined by the bonder roller arrangement.

The composite elastic material produced in this manner was tested on the Instron Model 1122 Universal Testing Instrument and the results are given in Tables 4, 5 and 6 under the heading "NSBL No. 2". Compared to the NSBL No. 1 material, the NSBL No. 2 material has less machine direction stretch and greater cross-machine direction stretch.

EXAMPLE 3

A layer of the neckable spunbonded polypropylene material having a basis weight of about 0.4 osy was prepared utilizing conventional Lurgi spunbonding process equipment. The Grab Tensile test properties of the material were measured utilizing an Instron Model 1122 Universal Testing Instrument and the results are reported in Table 7 under the heading "Spunbond Control No. 3".

A roll of this neckable spunbonded polypropylene material having an initial width of about 32 inches was wound on a Camachine 10 rewinder made by Cameron Machine Company of Brookland, N.Y. The wind-up roll was operated at a speed of about 38 feet per minute and the unwind roll operated at a speed of about 35 feet per minute causing the material to neck to a width of about 20 inches.

The roll of neckable spunbonded polypropylene having a necked width of about 20 inches were run through the "22 inch Face Pilot Coating Line" made by the Black-Clawson Company, Fulton, N.Y. The unwind roll was operated at a speed of about 5 feet per minute and the winder operated at a speed of from about 5 to about 8 feet per minute to further neck the spunbonded material to a final width of about 14 inches. The roll of necked spunbonded material was put on the top position of a three position roll unwind apparatus. The roll of elastic meltblown sheet from Example 1 (i.e., meltblown KRATON TM blend having a basis weight of 70 gsm) was placed on the middle position. The bonder rolls operated at a speed of about 20 feet/minute and the elastic sheet unwind roll operated at an speed of about 9 feet/minute. The spunbond sheet unwind roll was set at a speed of about 11 feet/minute but slippage occurred so the unwind speed was measured at about 20 feet/minute or about the same as the bonder rolls. However, enough tension was created to keep the necked spunbonded material in the necked condition.

The necked spunbonded material and the elastic meltblown sheet were joined utilizing the heated bonder roller arrangement of Example 1. The temperature of the calendar roller and anvil roller was set at 127° F. and the nip pressure was 355 pounds per linear inch.

The composite elastic necked-bonded material produced in this manner was tested on the Instron Model 1122 Universal Testing Instrument and the results are given in Tables 7, 8 and 9 under the heading "NSBL No. 3". Compared to the neckable spunbonded control material (Spunbond Control No. 3), all Grab Tensile Test results were lower for the composite elastic material except for the machine direction elongation and the cross-machine direction elongation which were significantly increased. Compared to the elastic meltblown sheet (Elastomer Control No. 1), the composite elastic material has about the same values during cycling but has higher Total Energy Absorbed and Peak Load at the breaking point of the composite elastic material (Tables 8 and 9).

EXAMPLE 4

A composite elastic necked-bonded material was prepared by joining a layer of the necked spunbonded polypropylene material of Example 3 (Spunbond Control No. 3) to each side of the elastic meltblown sheet of Example 1 (Elastomer Control No. 1).

A first roll of the necked spunbonded material was placed in the top position of a three position roll unwind apparatus. A second roll of 0.4 osy spunbonded polypropylene having an initial width of about 32 inches was wound on a Camachine 10 rewinder made by Cameron Machine Company of Brookland, N.Y. The wind-up roll was operated at a speed of about 42 feet per minute and the unwind roll operated at a speed of about 35 feet per minute causing the material to neck to a width of about 20 inches. The roll of spunbonded polypropylene having a necked width of about 20 inches was run through the "22 inch Face Pilot Coating Line" made by the Black-Clawson Company, Fulton, N.Y. The unwind roll was operated at a speed of about 5 feet per minute and the winder operated at a speed of from about 5 to about 8 feet per minute to further neck the spunbonded material to a final width of about 14 inches. The roll of necked spunbonded material was put on the bottom position of a three position roll unwind apparatus. A roll of the elastic meltblown material of Example 1 was placed in the middle position of the unwind apparatus.

The neckable spunbonded polypropylene materials and the elastic meltblown sheet were joined utilizing the heated bonder roller arrangement of Example 1. The elastic sheet unwind was set at 12 feet per minute. The necked spunbonded polypropylene material was unwound from its supply rolls at a rate of about 21 feet/minute, which provided enough tension to keep the necked spunbonded polypropylene in its necked condition. The bonder speed was set at 23 feet per minute, nip pressure was 355 pounds per linear inch, and the calendar roller and anvil roller temperatures were set at 127° F.

The composite elastic necked-bonded material produced in this manner was tested on the Instron Model 1122 Universal Testing Instrument. Results for the Grab Tensile Test for the Control materials and the composite elastic material are given in Tables 10 and 11 under the respective headings "Spunbond Control No. 3", "Elastomer Control No. 1" and "NSBL No. 4". Grab Tensile Test results for the composite elastic indicate less strength than neckable spunbonded control material but more strength than the elastomer. The cycle test data shows that the composite material has higher permanent set than the elastomer but much higher Total Energy Absorbed and Peak Load during the final cycle when elongated to break.

COMPARATIVE EXAMPLE 4

A composite elastic material was prepared in which a layer of the necked spunbonded polypropylene material of Example 4 was joined to each side of the elastic meltblown sheet of Example 4 except that the elastic sheet was not elongated while the necked spunbonded polypropylene was joined.

The necked spunbonded polypropylene material and the meltblown elastic sheet were joined utilizing the heated bonder roller arrangement of Example 1. The bonder speed was set at 18 feet per minute, nip pressure was 355 pounds per linear inch, and the calendar roller and anvil roller temperatures were set at 127° F. The elastic sheet unwind was set at 21 feet per minute so there would be no tensioning of the elastic web. The necked spunbond polypropylene materials were unwound at about 19 feet per minute so that there would be sufficient tension to maintain the spunbond materials in the necked condition. As a result, the the necked spunbonded materials did not form gathers or puckers after being joined to the elastic sheet because the elastic sheet was not maintained in a stretched conditions while the two layers were joined.

The resulting composite elastic material was tested on the Instron Model 1122 Universal Testing Instrument and the results are given in Table 12 under the heading "Composite No. 4". When compared to NSBL No. 4 produced with the same materials at the same process conditions except that the elastic meltblown sheet was elongated while it was joined to the spunbonded sheets, the properties of Composite No. 4 were not changed much except that the cross-machine direction elongation was greater for Composite No. 4 and the machine direction elongation was greater for NSBL No. 4.

EXAMPLE 5

The neckable spunbonded polypropylene material and the elastic sheet of meltblown fibers of Example 1 (i.e., Spunbond Control No. 1 and Elastomer Control No. 1) were joined according to the procedure of Example 1. The bonder speed was set at 21 feet per minute, nip pressure was 355 pounds per linear inch, and the calendar roller and anvil roller temperatures were set at 127° F. The elastic sheet was unwound from a supply roll at a rate of 14 feet per minute. The neckable spunbonded polypropylene material was unwound from a supply roll. The unwind speed was set at a rate of about 14 feet per minute but slippage occurred so the unwind speed was measured at about 17 feet per minute or about 20 percent slower than the bonder. The difference in speed created a tension which caused the neckable material to neck and the elastic material to elongate before they were joined by the bonder roller arrangement.

The composite elastic material produced in this manner was tested on the Instron Model 1122 Universal Testing Instrument and the results are given in Table 13 under the heading "NSBL No. 5".

COMPARATIVE EXAMPLE 5

The neckable spunbonded polypropylene material and the elastic sheet of meltblown fibers used in Example 5 (i.e., Spunbond Control No. 1 and Elastomer Control No. 1) were joined according to the procedure of Example 5 except that the elastomeric unwind was set at the same speed as the bonder rolls so that the elastomer was not elongated while it was joined to the necked spunbond material. The bonder speed was set at 21 feet per minute, nip pressure was 355 pounds per linear inch, and the calendar roller and anvil roller temperatures were set at 127° F. The elastic sheet was unwound from a supply roll at a rate of 21 feet per minute. The neckable spunbonded polypropylene material was unwound from a supply roll. The unwind speed of the spunbond supply roll was set at a rate of about 14 feet per minute but slippage occurred so the unwind speed was measured at about 17 feet per minute or about 20 percent slower than the bonder.

The composite material produced in this manner was tested on the Instron Model 1122 Universal Testing Instrument and the results are given in Table 13 under the heading "Composite No. 5". Compared to the NSBL No. 5 material, the Composite No. 5 material has similar values for Peak Load and Total Energy Absorbed, greater values for cross-machine direction stretch and lower values for machine direction stretch.

TABLE 1

|  | Spunbond Control No. 1 | Elastomer Control No. 1 | NSBL No. 1 |
| --- | --- | --- | --- |
| MD TEA | .88 ± .26 | 1.12 ± .34 | .31 ± .07 |
| MD Peak Load | 15.9 ± 3.8 | 1.54 ± .17 | 2.87 ± .35 |
| MD Peak Elong | 37 ± 5 | 427 ± 93 | 135 ± 14 |
| CD TEA | .90 ± .36 | .83 ± .03 | .30 ± .08 |
| CD Peak Load | 12.7 ± 2.8 | 1.22 ± .05 | 3.12 ± .48 |
| CD Peak Elong | 51 ± 8 | 407 ± 17 | 85 ± 12 |

TABLE 2

|  | CYCLE | | | | |
| --- | --- | --- | --- | --- | --- |
|  | 1 | 2 | 3 | 4 | To Break |
| Elastomer Control No. 1, Cycled in the cross-machine to 50% CD elongation | | | | | |
| Peak TEA | .025 ± .001 | .020 ± .002 | .020 ± .001 | .019 ± .001 | .052 ± .003 |
| Peak Load | .303 ± .013 | .287 ± .014 | .282 ± .013 | .278 ± 0.13 | .405 ± .018 |
| Perm Set | 7.6 ± .6 | 8.2 ± .6 | 8.9 ± 0 | 8.9 ± 0 |  |

TABLE 2-continued

| | CYCLE | | | | |
|---|---|---|---|---|---|
| | 1 | 2 | 3 | 4 | To Break |
| NSBL No. 1, cycled in the cross-machine direction to 48% CD elongation | | | | | |
| Peak TEA | .15 ± .08 | .07 ± .03 | .06 ± .03 | .06 ± .02 | .353 ± .123 |
| Peak Load | 2.5 ± 1.0 | 2.21 ± 1.0 | 2.10 ± .9 | 2.0 ± .9 | 3.8 ± .7 |
| Perm. Set | 11 ± 4 | 13 ± 4 | 18 ± 2 | 18 ± 2 | 78 ± 18 |

TABLE 3

| | CYCLE | | | | |
|---|---|---|---|---|---|
| | 1 | 2 | 3 | 4 | To Break |
| Elastomer Control No. 1, cycled in the machine direction to 75% MD elongation | | | | | |
| Peak TEA | .10 ± .003 | .07 ± .002 | .064 ± .002 | .062 ± .002 | .197 ± .005 |
| Peak Load | .616 ± .02 | .57 ± .02 | .56 ± .02 | .55 ± .02 | .763 ± .02 |
| Perm Set | 7 ± .7 | 8 ± 0 | 8.7 ± .4 | 9.2 ± 0 | — |
| NSBL No. 1, cycled in the machine direction to 76% MD elongation | | | | | |
| Peak TEA | .065 ± .008 | .046 ± .005 | .044 ± .005 | .043 ± .005 | 4.56 ± .08 |
| Peak Load | .538 ± .20 | .50 ± .18 | .48 ± .18 | .47 ± .17 | 3.7 ± .5 |
| Perm. Set | 5 ± 1 | 6 ± 1 | 7 ± 1 | 9 ± 1 | 130 ± 8 |

TABLE 4

| | NSBL No. 1 | NSBL No. 2 |
|---|---|---|
| MD TEA | .31 ± .07 | .39 (only one reading) |
| MD Peak Load | 2.87 ± .35 | 3.8 ± .6 |
| MD Peak Elong | 135 ± 14 | 94 ± 5 |
| CD TEA | .30 ± .08 | .37 ± .07 |
| CD Peak Load | 3.12 ± .48 | 3.0 ± .3 |
| CD Peak Elong | 85 ± 12 | 151 ± 20 |

TABLE 5

| | CYCLE | | | | |
|---|---|---|---|---|---|
| | 1 | 2 | 3 | 4 | To Break |
| Elastomer Control No. 1, cycled in the cross-machine direction to 90% CD elongation | | | | | |
| Peak TEA | .08 ± .01 | .06 ± .006 | .054 ± .005 | .05 ± .005 | .21 ± .01 |
| Peak Load | .46 ± .04 | .43 ± .03 | .42 ± .03 | .41 ± .03 | .63 ± .04 |
| Perm Set | 7 ± 1 | 9 ± 1 | 9 ± 1 | 9 ± 1 | |
| NSBL No. 2, cycled in the cross-machine direction to 90% CD elongation | | | | | |
| Peak TEA | .097 ± .01 | .052 ± .007 | .05 ± .006 | .046 ± .006 | .74 ± .15 |
| Peak Load | .78 ± .27 | .69 ± .25 | .66 ± .25 | .64 ± .23 | 3.59 ± .36 |
| Perm. Set | 9 ± 2 | 11 ± 2 | 12 ± 2 | 16 ± 3 | 177 ± 18 |

TABLE 6

| | CYCLE | | | | |
|---|---|---|---|---|---|
| | 1 | 2 | 3 | 4 | To Break |
| Elastomer Control No. 1, cycled in the machine direction to 60% MD elongation | | | | | |
| Peak TEA | .07 ± .002 | .05 ± .002 | .05 ± .001 | .045 ± .002 | .103 ± .002 |
| Peak Load | .55 ± .01 | .52 ± .01 | .50 ± .01 | .50 ± .01 | .652 ± .01 |
| Perm Set | 7 ± 0 | 8 ± 0 | 9 ± 1 | 9 ± 1 | |
| NSBL No. 2, cycled in the machine direction to 63% MD elongation | | | | | |
| Peak TEA | .177 ± .05 | .104 ± .02 | .10 ± .02 | .09 ± .01 | .49 ± .1 |
| Peak Load | 3.55 ± .6 | 3.2 ± .5 | 3.1 ± .4 | 3.0 ± .4 | 5.5 ± .7 |
| Perm. Set | 9 ± 2 | 11 ± 3 | 11 ± 3 | 14 ± 4 | 88 ± 4 |

TABLE 7

| | Spunbond Control No. 3 | Elastomer Control No. 1 | NSBL No. 3 |
|---|---|---|---|
| MD TEA | 0.57 ± .18 | 1.12 ± .34 | 0.23 ± .001 |
| MD Peak Load | 13.8 ± 1.5 | 1.54 ± .17 | 2.66 ± .23 |
| MD Peak Elong | 31 ± 5 | 427 ± 93 | 141 ± 11 |
| CD TEA | 0.69 ± .13 | 0.83 ± .03 | 0.38 ± .01 |
| CD Peak Load | 12.4 ± 2.3 | 1.22 ± .05 | 2.6 ± .2 |
| CD Peak Elong | 42 ± 3 | 407 ± 17 | 176 ± 20 |

TABLE 8

| | CYCLE | | | | |
|---|---|---|---|---|---|
| | 1 | 2 | 3 | 4 | To Break |
| NSBL No. 3, cycled in the cross-machine direction to 114% CD elongation | | | | | |
| Peak TEA | .131 ± .02 | .066 ± .004 | .061 ± .003 | .058 ± .003 | .51 ± .17 |
| Peak Load | .90 ± .24 | .79 ± .20 | .75 ± .19 | .72 ± .18 | 3.16 ± .74 |
| Perm Set | 11 ± 1 | 13 ± 2 | 14 ± 2 | 16 ± 2 | 172 ± 15 |
| Elastomer Control No. 1, cycled in the cross-machine direction to 114% CD elongation | | | | | |
| Peak TEA | .14 ± .002 | .09 ± .001 | .09 ± .001 | .08 ± .001 | .20 ± .002 |
| Peak Load | .57 ± .005 | .53 ± .003 | .52 ± .005 | .51 ± .004 | .68 ± .01 |

TABLE 8-continued

| | CYCLE | | | | |
|---|---|---|---|---|---|
| | 1 | 2 | 3 | 4 | To Break |
| Perm. Set | 8 ± 0 | 9 ± .5 | 10 ± .5 | 10 ± .5 | — |

TABLE 9

| | CYCLE | | | | |
|---|---|---|---|---|---|
| | 1 | 2 | 3 | 4 | To Break |
| NSBL No. 3, cycled in the machine direction to 97% MD elongation | | | | | |
| Peak TEA | .083 ± .008 | .059 ± .005 | .057 ± .005 | .056 ± .004 | .493 ± .14 |
| Peak Load | .76 ± .34 | .67 ± .29 | .67 ± .30 | .65 ± .28 | 4.73 ± .40 |
| Perm Set | 4.4 ± 1.1 | 5.2 ± 1.1 | 6.0 ± 1.2 | 9.0 ± 2.3 | 137 ± 7 |
| Elastomer Control No. 1, cycled in the machine direction to 97% MD elongation | | | | | |
| Peak TEA | .15 ± .01 | .10 ± .005 | .09 ± .004 | .089 ± .004 | .184 ± .01 |
| Peak Load | .7 ± .03 | .65 ± .03 | .63 ± .03 | .62 ± .03 | .786 ± .03 |
| Perm. Set | 7 ± 0 | 8 ± 0 | 9 ± 0 | 9 ± 0 | — |

TABLE 10

| | Spunbond Control No. 3 | Elastomer Control No. 1 | NSBL No. 4 Control No. 4 |
|---|---|---|---|
| MD TEA | 0.57 ± .18 | 1.12 ± .34 | 0.38 ± .07 |
| MD Peak Load | 13.8 ± 1.5 | 1.54 ± .17 | 4.2 ± .6 |
| MD Peak Elong | 31 ± 5 | 427 ± 93 | 130 ± 11 |
| CD TEA | 0.69 ± .13 | 0.83 ± .03 | .52 ± .09 |
| CD Peak Load | 12.4 ± 2.3 | 1.22 ± .05 | 3.6 ± .5 |
| CD Peak Elong | 42 ± 3 | 407 ± 17 | 160 ± 11 |

TABLE 11

| | CYCLE | | | | |
|---|---|---|---|---|---|
| | 1 | 2 | 3 | 4 | To Break |
| NSBL No. 4, cycled in the cross-machine direction to 90% CD elongation | | | | | |
| Peak TEA | .17 ± .03 | .065 ± .007 | .06 ± .005 | .05 ± .005 | .72 ± .21 |
| Peak Load | 1.67 ± .30 | 1.43 ± .26 | 1.33 ± .23 | 1.28 ± .24 | 4.62 ± .84 |
| Perm Set | 18 ± 3 | 20 ± 3 | 21 ± 3 | 24 ± 3 | 151 ± 14 |
| Elastomer Control No. 1, cycled in the cross-machine direction to 90% CD elongation | | | | | |
| Peak TEA | .086 ± .005 | .06 ± .004 | .06 ± .003 | .055 ± .003 | .161 ± .01 |
| Peak Load | .478 ± .02 | .45 ± .02 | .43 ± .02 | .42 ± .02 | .598 ± .03 |
| Perm. Set | 7.5 ± .3 | 8 ± .3 | 9.6 ± .3 | 9.8 ± 0 | — |

TABLE 12

| | Composite No. 4 | NSBL No. 4 |
|---|---|---|
| MD TEA | .33 ± .06 | .38 ± .07 |
| MD Peak Load | 5.8 ± .5 | 4.2 ± .6 |
| MD Peak Elong | 48 ± 4 | 130 ± 11 |
| CD TEA | .6 ± .1 | .5 ± .1 |
| CD Peak Load | 3.1 ± .5 | 3.6 ± .5 |
| CD Peak Elong | 229 ± 12 | 160 ± 11 |

TABLE 13

| Grab Tensile | Composite No. 5 | NSBL No. 5 |
|---|---|---|
| MD TEA | .35 ± .05 | .39 (one test only) |
| MD Peak Load | 4.57 ± .21 | 3.8 ± .6 |
| MD Elong | 50 ± 5 | 94 ± 5 |
| CD TEA | .54 ± .15 | .37 ± .07 |
| CD Peak Load | 2.45 ± .31 | 3.0 ± .3 |
| CD Elong | 217 ± 23 | 151 ± 20 |

RELATED APPLICATIONS

This application is one of a group of commonly assigned patent applications which are being filed on the same date. The group includes the present application and application Ser. No. 07/451,281. in the name of Michael T. Morman and entitled "Multi-Direction Stretch Composite Elastic Material Including a Reversibly Necked Material". The subject matter of that application is incorporated herein by reference.

Disclosure of the presently preferred embodiment of the invention is intended to illustrate and not to limit the invention. It is understood that those of skill in the art should be capable of making numerous modifications without departing from the true spirit and scope of the invention.

What is claimed is:

1. A composite elastic material capable of stretching in at least two directions comprising:
    at least one elastic sheet; and
    at least one necked material joined to the elastic sheet at least at three locations arranged in a nonlinear configuration, the necked material being gathered between at least two of the locations.

2. The material of claim 1 wherein the elastic sheet comprises an elastomeric polymer selected from the group consisting of elastic polyesters, elastic polyurethanes, elastic polyamides, elastic copolymers of ethylene and at least one vinyl monomer, and elastic A-B-A' block copolymers wherein A and A' are the same or different thermoplastic polymer, and wherein B is an elastomeric polymer block.

3. The material of claim 1 wherein the elastic sheet is an elastic web of meltblown fibers.

4. The material of claim 3 wherein the web of meltblown fibers includes microfibers.

5. The material of claim 2 wherein the elastomeric polymer is blended with a processing aid.

6. The material of claim 1 wherein the elastic sheet is a pressure sensitive elastomeric adhesive sheet.

7. The material of claim 6 wherein the pressure sensitive elastomeric adhesive sheet is formed from a blend of an elastomeric polymer and a tackifying resin.

8. The material of claim 7 wherein the blend further includes a processing aid.

9. The material of claim 6 wherein the pressure sensitive elastomer adhesive sheet is a pressure sensitive elastomer adhesive web of meltblown fibers.

10. The material of claim 9 wherein the web of meltblown fibers include meltblown microfibers.

11. The material of claim 1 wherein the necked material is a material selected from the group consisting of knitted fabrics, loosely woven fabrics, and nonwoven materials.

12. The material of claim 11 wherein the nonwoven material is a web selected from the group consisting of a bonded carded web of fibers, a web of spunbonded fibers, a web of meltblown fibers, and a multilayer material including at least one of the webs.

13. The material of claim 12 wherein the web of meltblown fibers includes microfibers.

14. The material of claim 12 wherein the fibers comprise a polymer selected from the group consisting of polyolefins, polyesters, and polyamides.

15. The material of claim 14 wherein the polyolefin is selected from the group consisting of one or more of polyethylene, polypropylene, polybutylene, ethylene copolymers, propylene copolymers, and butylene copolymers.

16. The material of claim 1 wherein the necked material is a composite material comprising a mixture of fibers and one or more other materials selected from the group consisting of wood pulp, staple fibers, particulates and super-absorbent materials.

17. A composite elastic material capable of stretching in at least two directions comprising:
at least one elastic web of meltblown fibers; and
at least one necked nonwoven web of polypropylene fibers joined to the elastic web at least at three locations arranged in a nonlinear configuration, the necked web being gathered between at least two of the locations.

18. The material of claim 17 wherein the web of meltblown fibers includes microfibers.

19. The material of claim 17 wherein the elastic web of meltblown fibers comprises an elastomeric polymer selected from the group consisting of elastic polyesters, elastic polyurethanes, elastic polyamides, elastic copolymers of ethylene and at least one vinyl monomer, and elastic A-B-A' block copolymers wherein A and A' are the same or different thermoplastic polymer, and wherein B is an elastomeric polymer block.

20. The material of claim 19 wherein the elastomeric polymer is blended with a processing aid.

21. The material of claim 17 wherein the elastic web of meltblown fibers is a pressure sensitive elastomeric adhesive web of meltblown fibers.

22. The material of claim 21 wherein the pressure sensitive elastomer adhesive web of meltblown fibers is formed from a blend of an elastomeric polymer and a tackifying resin.

23. The material of claim 22 wherein the blend further includes a processing aid.

24. The material of claim 17 wherein the necked nonwoven web of polypropylene fibers is selected from the group consisting of a bonded carded web of polypropylene fibers, a web of spunbond polypropylene fibers, a web of meltblown polypropylene fibers, and a multilayer material including at least one of the webs.

25. The material of claim 24 wherein the web of meltblown fibers includes microfibers.

26. The material of claim 17 wherein the necked nonwoven web of polypropylene fibers is a composite web comprising a mixture of polypropylene fibers and one or more other material selected from the group consisting of wood pulp, staple fibers, particulates and super-absorbent materials.

* * * * *

UNITED STATES PATENT AND TRADEMARK OFFICE
CERTIFICATE OF CORRECTION

PATENT NO. : 5,116,662
DATED : May 26, 1992
INVENTOR(S) : Michael T. Morman

It is certified that error appears in the above-indentified patent and that said Letters Patent is hereby corrected as shown below:

Column 6, line 54, "loose" should read --lose--;

Column 10, line 37, "by joined by" should read --be joined by--;

Column 11, line 5, "two the" should read --two of the--;

Column 16, line 8, "an speed" should read --a speed--;

Column 17, line 41, "the the" should read --the--;

Column 17, line 44, "conditions" should read --condition--;

Column 21, line 66, "07/451,281." should read --07/451,281--.

Signed and Sealed this

Fourteenth Day of September, 1993

Attest:

BRUCE LEHMAN

*Attesting Officer*  *Commissioner of Patents and Trademarks*